No. 688,497. Patented Dec. 10, 1901.
F. WEIMAR.
LEVEL.
(Application filed Feb. 4, 1901.)
(No Model.)
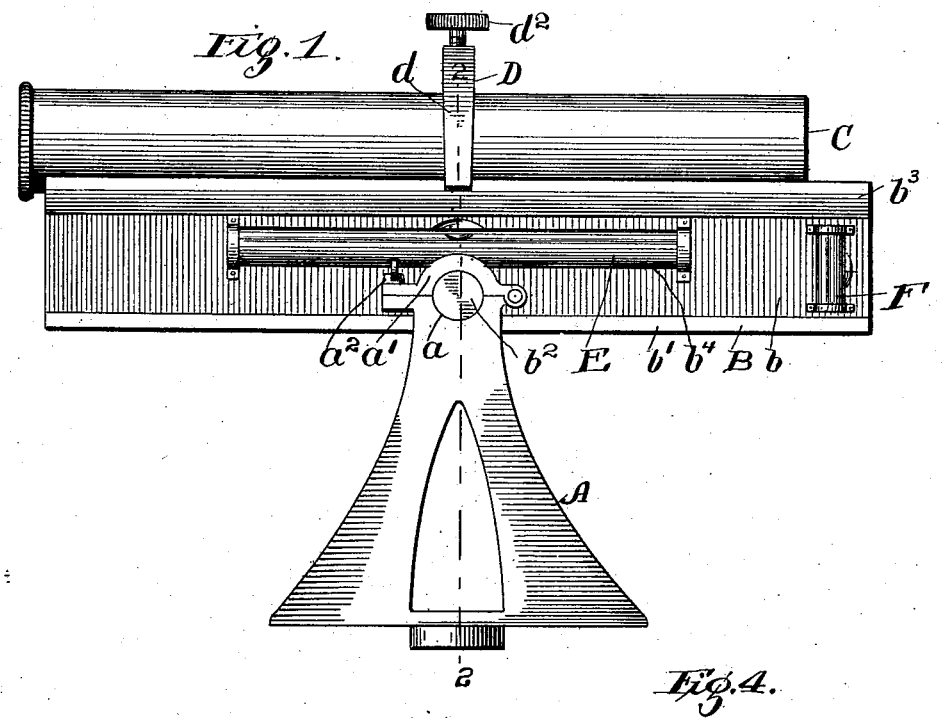
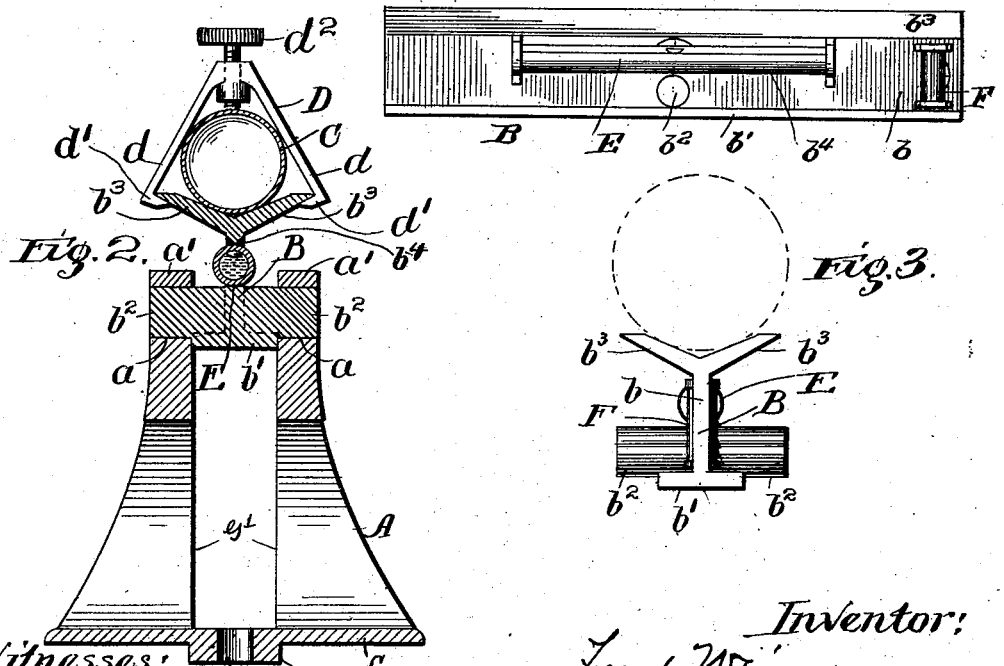
Witnesses:
Chas. O. Shervey.
S. Bliss.
Inventor:
Fred Weimar
by Westervelt & Bitner
Attys.

UNITED STATES PATENT OFFICE.

FRED WEIMAR, OF CHICAGO, ILLINOIS, ASSIGNOR OF TWO-THIRDS TO S. A. FRENCH, OF CHICAGO, ILLINOIS, AND T. D. HEWITT, OF FREEPORT, ILLINOIS.

LEVEL.

SPECIFICATION forming part of Letters Patent No. 688,497, dated December 10, 1901.

Application filed February 4, 1901. Serial No. 45,851. (No model.)

*To all whom it may concern:*

Be it known that I, FRED WEIMAR, a citizen of the United States of America, residing at Chicago, in the county of Cook and State of Illinois, have invented certain new and useful Improvements in Levels, of which the following is a specification.

The object of my invention is to produce a surveyor's level having as a readily-detachable constituent part a simple and accurate shop or mechanic's level adapted for a great variety of uses other than for leveling.

In the accompanying drawings, Figure 1 is a side elevation of a complete structure adapted to serve as a surveyor's level when secured upon a tripod or the like. (Not shown.) Fig. 2 is a section on the line 2 2, Fig. 1. Fig. 3 is an end view of the mechanic's level detached. Fig. 4 is a side view of the mechanic's level shown in Fig. 3.

In the views, A represents a rigid frame made up of a plane base G and two standards G', having at their upper ends accurately-alined shaft-bearings $a$, completed by hinged clips $a'$, secured by thumb-screws $a^2$. The base G is centrally perforated at $G^2$, and around this opening is a dependent annular boss $G^3$. That portion B of the structure which may be detached to serve as a shop-level is mounted in this frame to swing in a vertical plane between the two standards. It preferably consists of a plane web $b$, having at its middle oppositely-projecting gudgeons $b^2$, accurately fitting the bearings $a$, and provided at its lower side with flanges $b'$, extending oppositely outward from the web at right angles, and at its upper side with analogous upwardly-divergent flanges $b^3$. The lower side of the web and its flanges $b'$ form a plane plate having perfectly straight and parallel lateral edge surfaces, and the flanges $b^3$ form a single long Y to receive a telescope-tube C or to serve other purposes when the mechanic's level is detached. The tube C may be detachably secured in place by a detachable forked clamp D, having at the end of each branch $d$ a hook $d'$ to engage the corresponding flange $b^3$ and at its upper end a set-screw $d^2$ to gently press upon the tube C. The instrument is leveled by means of a spirit-level tube E, fixed in an opening $b^4$ cut in the web $b$ and in such manner that the tube can be readily seen from either side. A second and similar tube F' is also set in the web $b$, so that the part B when detached, as hereinafter stated, may serve the purposes of a plumb-line or test of perpendicularity.

The structure described is a very simple surveyor's level capable of resisting very rough usage without losing its accuracy.

The clamp D and telescope-tube C being removed, the structure B when lifted from its bearings is the mechanic's level seen in Figs. 3 and 4. Such level is adapted for all the uses of an ordinary spirit-level and in addition may serve many other purposes. For example, it may be used for leveling a shaft, as suggested in Fig. 3, where the shaft is shown in dotted line, or for accurately centering the end of any cylindrical bar, or for drawing straight lines along the bar parallel to its axis. For whatever purpose it may be used it is a compact implement whose I-beam form makes it extremely strong and little liable to injury, especially since the flanges project on each side far beyond the spirit-level tubes.

What I claim is—

1. A mechanic's level consisting of a vertical central web provided at its lower side with opposite flanges forming a plane parallel-edged base-plate, at its upper side with upwardly-diverging flanges forming a trough-like top projecting beyond the web upon each side, at its middle with oppositely-projecting gudgeons, and at suitable points with spirit-level tubes set approximately in the plane of the web and at right angles to each other.

2. The combination with a mechanic's level having gudgeons projecting oppositely from its middle portion and provided with upwardly-divergent lateral flanges at its upper edge, of a frame adapted to be secured upon a surveyor's tripod and to revolubly and detachably support said gudgeons, a telescope-tube resting in the trough formed by said flanges and a clamp for fixing the tube in place.

3. The combination with a mechanic's level having its upper and lower longitudinal elements parallel straight lines, provided with oppositely-projecting trunnions approximately midway between its ends, and having a longitudinal recess in its upper side, of a telescope-tube resting in said recess, a removable clamp for binding the tube in place, and a frame adapted to be revolubly mounted upon a surveyor's tripod and to detachably and revolubly hold said trunnions.

4. The combination with a mechanic's level the body of which consists of a normally vertical web with lateral gudgeons midway between its ends and having at its lower side opposite flanges forming a plane parallel-edged base, and at its upper side upwardly-divergent flanges forming a trough-like recess, of a telescope-tube resting in said recess, a forked clamp passing over the tube, engaging the divergent flanges and held in place by a screw clamping the tube, and a frame pivotally and detachably supporting said gudgeons and adapted to be revolubly mounted upon a surveyor's tripod.

In witness whereof I have hereunto set my hand, at Chicago, in the county of Cook and State of Illinois, this 19th day of January, A. D. 1901.

FRED WEIMAR.

Witnesses:
CHAS. O. SHERVEY,
S. BLISS.